(12) United States Patent
Sheng et al.

(10) Patent No.: US 9,514,364 B2
(45) Date of Patent: Dec. 6, 2016

(54) EFFICIENT FOREST SENSING BASED EYE TRACKING

(71) Applicant: QUALCOMM Incorporated, San Diego, CA (US)

(72) Inventors: Tao Sheng, Richmond Hill (CA); Alwyn Dos Remedios, Vaughn (CA)

(73) Assignee: QUALCOMM Incorporated, San Diego, CA (US)

( * ) Notice: Subject to any disclaimer, the term of this patent is extended or adjusted under 35 U.S.C. 154(b) by 163 days.

(21) Appl. No.: 14/290,408

(22) Filed: May 29, 2014

(65) Prior Publication Data

US 2015/0347814 A1 Dec. 3, 2015

(51) Int. Cl.
  *G06K 9/00* (2006.01)
  *G06K 9/46* (2006.01)
  *G06F 3/01* (2006.01)

(52) U.S. Cl.
  CPC ............. *G06K 9/0061* (2013.01); *G06F 3/013* (2013.01); *G06K 9/00604* (2013.01); *G06K 9/00617* (2013.01); *G06K 9/00624* (2013.01); *G06K 9/46* (2013.01); *G06K 9/4609* (2013.01); *G06K 2009/4666* (2013.01)

(58) Field of Classification Search
  None
  See application file for complete search history.

(56) References Cited

U.S. PATENT DOCUMENTS

| | | | |
|---|---|---|---|
| 6,263,088 B1 | 7/2001 | Crabtree et al. | |
| 6,332,038 B1 | 12/2001 | Funayama et al. | |
| 6,542,625 B1 | 4/2003 | Lee et al. | |
| 6,590,999 B1 | 7/2003 | Comaniciu et al. | |
| 6,937,744 B1 | 8/2005 | Toyama | |
| 7,058,209 B2 | 6/2006 | Chen et al. | |
| 7,702,425 B2 | 4/2010 | Hougen | |
| 7,756,296 B2 | 7/2010 | Porikli et al. | |

(Continued)

OTHER PUBLICATIONS

Y. Matsumoto and A. Zelinsky, "An Algorithm for Real-time Stereo Vision Implementation of Head Pose and Gaze Direction Measurement," Fourth IEEE International Conference on Automatic Face and Gesture Recognition, Mar. 28, 2000-Mar. 30, 2000.*

(Continued)

*Primary Examiner* — Matthew Bella
*Assistant Examiner* — Soo Shin
(74) *Attorney, Agent, or Firm* — Kilpatrick Townsend & Stockton LLP

(57) ABSTRACT

Methods, systems, computer-readable media, and apparatuses for novel eye tracking methodologies are presented. Specifically, after an initial determination of a person's eyes within a field of view (FOV), methods of the present disclosures may track the person's eyes even with part of the face occluded, and may quickly re-acquire the eyes even if the person's eyes exit the FOV. Each eye may be tracked individually, at a faster rate of eye tracking due to the novel methodology, and successful eye tracking even at low image resolution and/or quality is possible. In some embodiments, the eye tracking methodology of the present disclosures includes a series of sub-tracker techniques, each performing different eye-tracking functions that, when combined, generate a highest-confidence location of where the eye has moved to in the next image frame.

30 Claims, 11 Drawing Sheets

(56) References Cited

U.S. PATENT DOCUMENTS

| | | |
|---|---|---|
| 7,817,822 B2 | 10/2010 | Sun et al. |
| 7,840,061 B2 | 11/2010 | Porikli et al. |
| 2005/0063568 A1* | 3/2005 | Sun et al. .......... G06K 9/00234 382/117 |
| 2009/0284608 A1 | 11/2009 | Hong et al. |
| 2011/0110560 A1 | 5/2011 | Adhikari |
| 2011/0274315 A1 | 11/2011 | Fan et al. |
| 2011/0293136 A1 | 12/2011 | Porikli |
| 2012/0078097 A1 | 3/2012 | Wang et al. |
| 2012/0082381 A1 | 4/2012 | Maki et al. |
| 2012/0201469 A1 | 8/2012 | Livet et al. |
| 2012/0225719 A1 | 9/2012 | Nowozin et al. |
| 2013/0272570 A1 | 10/2013 | Sheng et al. |
| 2014/0044342 A1 | 2/2014 | Hong et al. |

OTHER PUBLICATIONS

X. Zhang, "Eye Location Based on Adaboost and Random Forests," Journal of Software, vol. 7, No. 10, Oct. 2012, pp. 2365-2371.*

Y. Feng, D. Hu, and P. Ning, "A Combined Eye States Identification Method for Detection of Driver Fatigue," IET International Communication Conference on Wireless Mobile and Computing (CCWMC 2009), Dec. 7-9, 2009, pp. 217-220, Shanghai, China.*

International Search Report and Written Opinion—PCT/US2015/025773—ISA/EPO—Jul. 7, 2015.

Comaniciu, et al., "Kernel-Based Object Tracking," IEEE Transactions on Pattern Analysis and Machine Intelligence, vol. 25, No. 5, May 2003, pp. 564-577.

Kalal, et al., "P-N learning: Bootstrapping Binary Classifiers by Structural Constraints," 2010 IEEE Conference on Computer Vision and Pattern Recognition (CVPR), 2010, pp. 49-56.

Lucas, et al., "An Iterative Image Registration Technique with an Application to Stereo Vision," From Proceedings of Imaging Understanding Workshop, pp. 121-130, 1981.

Safavian, et al., "A survey of Decision Tree Classifier Methodology", IEEE Transactions on Systems, Man, and Cybernetics, vol. 21, No. 3, May/Jun. 1991, pp. 660-674.

Santer J et al., "PROST: Parallel Robust Online Simple Tracking", 2010 IEEE Conference on Computer Vision and Pattern Recognition (CVPR), Jun. 13-18, 2010, pp. 723-730, XP031725970.

Yang H et al., "Recent Advances and Trends in Visual Tracking: A Review", Neurocomputing, , vol. 74, No. 18, Jul. 28, 2011 (200-07-28), pp. 3823-3831, XP028301666.

Zhang X., et al., "Eye Location Based on Adaboost and Random Forests," Journal of Software, vol. 7, No. 10, Oct. 2012, pp. 2365-2371.

* cited by examiner

EFFICIENT FOREST SENSING BASED EYE TRACKING

CROSS-REFERENCES TO RELATED APPLICATIONS

The present application is related to U.S. Non-Provisional application Ser. No. 13/797,579 titled "ROBUST AND EFFICIENT LEARNING OBJECT TRACKER" filed Mar. 12, 2013, the contents of which are herein incorporated by reference for all purposes.

BACKGROUND

Embodiments of the disclosure relate to eye tracking. More specifically, aspects of the disclosure relate to tracking eyes in video using a novel approach that is both energy and time-efficient. In recent years, the increased sophistication and accessibility of eye tracking technologies have generated a great deal of interest in the commercial sector. Applications include web usability, advertising, sponsorship, package design, gaming, and automotive engineering. However, current eye tracking algorithms have a number of limitations. For example, current eye trackers tend to require the entire face to be within the field of view (FOV). Problems may arise if part of the face is covered, e.g. by hair, or the FOV is too close such that only part of the face is shown. Because conventional eye trackers require detecting the whole face before locating the eyes in the face, the rate of the eye tracking is slowed or hampered due to the additional processing of tracking the face first. Furthermore, conventional eye trackers require a timely re-initialization phase whenever eye tracking is lost, e.g., a person leaves the FOV and then comes back, or the person turns his face away and back again.

Accordingly, a need exists for improved eye tracking.

BRIEF SUMMARY

Certain embodiments are described for tracking eyes in video using a novel approach that is both energy and time-efficient.

In some embodiments, a method for tracking an eye includes receiving a first image comprising a face and the eye. The method also includes determining an initial position of the eye in a field of view (FOV) based on the received first image. The method additionally includes receiving a second image comprising a portion of the face including the eye. The method further includes tracking a change in a position of the eye from the initial position of the eye based on the received second image.

In some embodiments, the method also includes generating a plurality of positive image samples, each representing a high-confidence detection of the eye.

In some embodiments, the method also includes generating a plurality of negative image samples, each representing a high-confidence detection of a portion of the first image other than the eye.

In some embodiments, tracking a change in the position of the eye is based further on the plurality of positive image samples and the plurality of negative image samples.

In some embodiments, the method also includes generating an intersection bounding box comprising the eye and a subset of the portion of the face, and wherein tracking a change in the position of the eye is based further on the intersection bounding box.

In some embodiments, the method also includes detecting motion of the eye between the first image and the second image.

In some embodiments, tracking a change in the position of the eye is based further on the detected motion of the eye.

In some embodiments, the tracking step is performed in real-time.

In some embodiments, an apparatus for tracking an eye includes a camera configured to capture one or more images. The apparatus further includes a memory including one or more tracking modules. The apparatus also includes a processor coupled to the camera and memory. The processor is operable, when the one or more tracking modules are executed to, receive, via the camera, a first image comprising a face and the eye, determine an initial position of the eye in a field of view (FOV) based on the received first image, receive, via the camera, a second image comprising a portion of the face including the eye, and track a change in a position of the eye from the initial position of the eye based on the received second image.

In some embodiments, an apparatus for tracking an eye includes means for receiving a first image comprising a face and the eye. The apparatus further includes means for determining an initial position of the eye in a field of view (FOV) based on the received first image. The apparatus additionally includes means for receiving a second image comprising a portion of the face including the eye. The apparatus also includes means for tracking a change in a position of the eye from the initial position of the eye based on the received second image.

In some embodiments, a processor-readable non-transitory medium comprising processor readable instructions is configured to cause a processor to receive a first image comprising a face and the eye, determine an initial position of the eye in a field of view (FOV) based on the received first image, receive a second image comprising a portion of the face including the eye, and track a change in a position of the eye from the initial position of the eye based on the received second image.

BRIEF DESCRIPTION OF THE DRAWINGS

Aspects of the disclosure are illustrated by way of example. In the accompanying figures, like reference numbers indicate similar elements, and.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

The present disclosures discuss novel eye tracking methodologies that solve the problems mentioned above and more. Specifically, after an initial determination of a person's eyes within the FOV, methods of the present disclosures may track the person's eyes even with part of the face occluded, and may quickly re-acquire the eyes even if the person's eyes exit the FOV and then re-enter to the FOV. Additional benefits may include tracking each eye individually, faster rate of eye tracking due to the novel methodology, and successful eye tracking even at low image resolution and/or quality. In some embodiments, the eye tracking methodology of the present disclosures includes a series of sub-tracker techniques, each performing different eye-tracking functions that, when combined, generate a highest-confidence location of where the eye has moved to in the next image frame.

Figure 1:
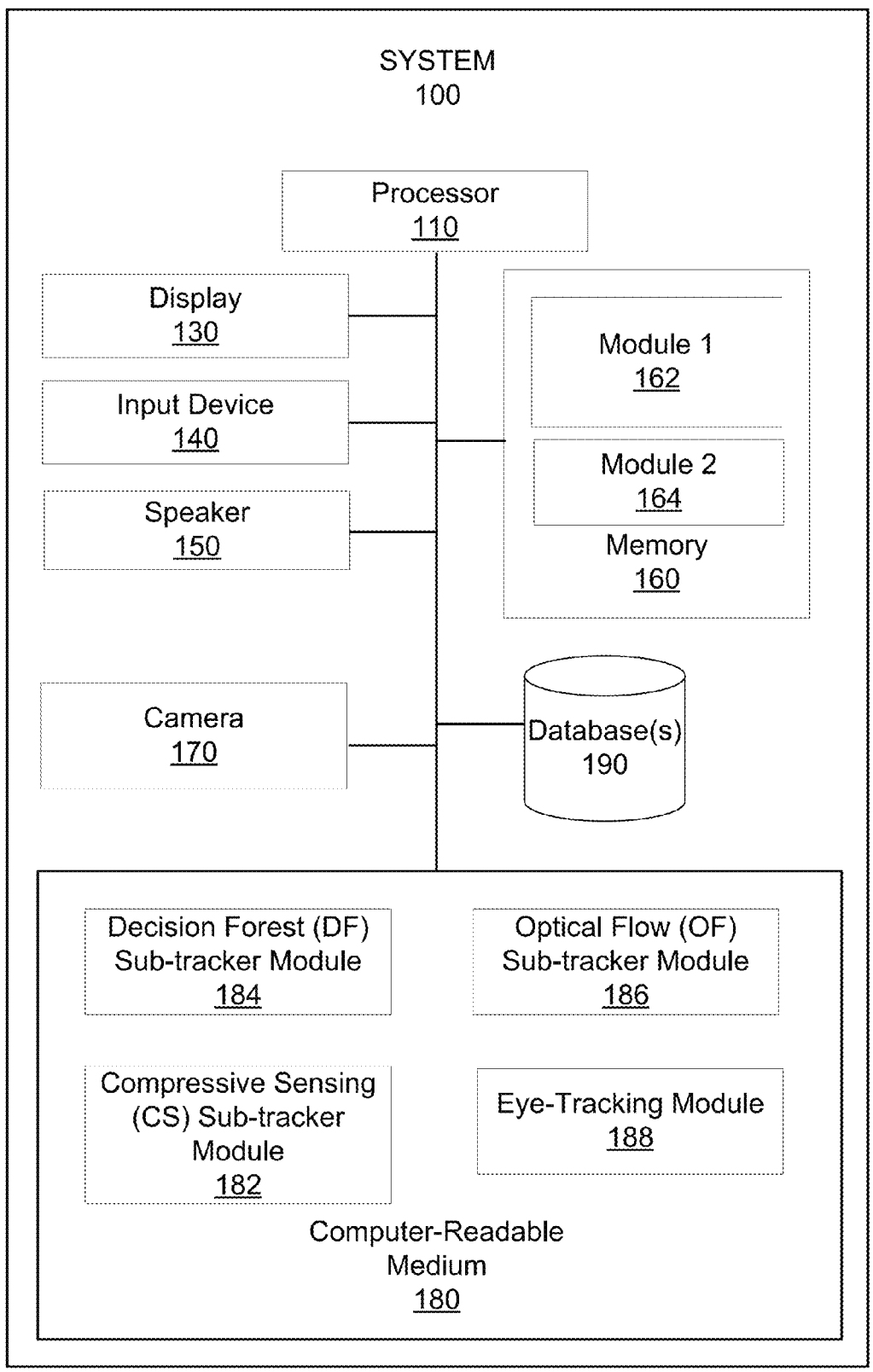
FIG. 1 illustrates a simplified diagram of a system that may incorporate one or more embodiments.

FIG. 1 illustrates a simplified diagram of a system 100 that may incorporate one or more embodiments. In some embodiments, the system 100 may be a portable device, such as a smartphone, tablet computer, etc. System 100 may include a processor 110, display 130, input device 140, speaker 150, memory 160, camera 170, and computer-readable medium 180.

Processor 110 may be any general-purpose processor operable to carry out instructions on the system 100. The processor 110 is coupled to other units of the system 100 including display 130, input device 140, speaker 150, memory 160, camera 170, and computer-readable medium 180.

Display 130 may be any device that displays information to a user. Examples may include an LCD screen, CRT monitor, or seven-segment display.

Input device 140 may be any device that accepts input from a user. Examples may include a keyboard, keypad, mouse, or touch input.

Speaker 150 may be any device that outputs sound to a user. Examples may include a built-in speaker or any other device that produces sound in response to an electrical audio signal.

Memory 160 may be any magnetic, electronic, or optical memory. Memory 160 includes two memory modules, module 1 162 and module 2 164. It can be appreciated that memory 160 may include any number of memory modules. An example of memory 160 may be dynamic random access memory (DRAM).

Camera 170 may be an image capture device configured to capture images. Camera 170 may capture either still images or continuous images (video). In some embodiments, camera 170 may be configured to capture images for eye tracking.

Computer-readable medium 180 may be any magnetic, electronic, optical, or other computer-readable storage medium. Computer-readable medium 180 may include one or more software modules executable by processor 110. Computer-readable medium 180 may include compressive sensing (CS) sub-tracker module 182, decision forest (DF) sub-tracker module 184, optical flow (OF) sub-tracker module 186, and eye-tracking module 188.

The CS sub-tracker module 182 may be configured to track the iris portion of the eye. The CS sub-tracker module 182 may interface with the camera 170, via the eye-tracking module 188 as described in further detail below. In some embodiments, the CS sub-tracker module 182 builds a dataset of images representing what the eye is likely to look like (called a "positive dataset"), and another dataset of images representing what the eye is likely to not look like (called a "negative dataset"). The combination of a positive and negative dataset allows the CS sub-tracker module 182 to more easily distinguish what part of the image is likely to be the eye compared to everything else. Building these datasets allows the present disclosures to not need to detect the entire face repeatedly in multiple frames, which is a major source of inefficiency. Rather, the positive and negative datasets can be accessed and compared to image data in later frames to quickly recognize what parts of the image are likely to be the eye and what parts are not. In some embodiments, the positive and negative datasets focus on a positive and negative identification, respectively, of the iris portion of the eye itself.

The DF sub-tracker module 184 may be configured to generate a portion of the face that includes at least one eye and the surrounding region with consistent features therein (such as skin, eye brows, nose-bridge, glasses frame). This may be referred to as an "intersection bounding box" or "encompassing bounding box." Advantageously, the intersection bounding box need not include the entire face. For example, the intersection bounding box may include only a rectangular area around both eyes, including the eye brows, top of the cheek bones, and the bridge of the nose. The DF sub-tracker module 184 may not possess as fine of detail as the CS sub-tracker module 182 that tracks the irises themselves, but may be quick to compute and provides a relationship involving one or both eyes, e.g., demonstrates which eye is left and which is right. The DF sub-tracker module 184 may also serve as a bound to corroborate where the eyes actually are, to minimize false positives that may report an eye is outside of the intersection bounding box. The DF sub-tracker module 184 may also be effective at recovering the general area of the eyes, which is particularly useful when the eyes leave the FOV and come back. In some embodiments, a different positive and negative dataset for the intersection of the eyes is built to help determine where the intersection bounding box should be in subsequent images. In some embodiments, the DF sub-tracker module may function as a motion tracker.

The OF sub-tracker module 186 may be optimized to detect motion in the image captured by the camera 170. The OF sub-tracker module 186 may compare differences between pairs of images, and thus may not need to generate any positive or negative datasets. This OF sub-tracker module 186 may be used to quickly identify where the eyes have moved to generally, particularly if there are drastic changes in the eyes' positions from one frame to the next.

The eye-tracking module 188 may be configured to interface with the camera 170 to perform eye-tracking functions. The eye-tracking module 188 may receive data from or send data to at least one of the CS sub-tracker module 182, DF sub-tracker module 184, and/or the OF sub-tracker module 186. For example, the eye-tracking module 188 may interface with the camera 170 to capture an image(s) of a user's face, or part of a user's face. The eye-tracking module 188 may then provide the CS sub-tracker module 182, DF sub-tracker module 184, and/or the OF sub-tracker module 186 access to the captured image(s) so that the various modules pay perform their respective sub-tracking techniques on the captured image(s). In this sense, the eye-tracking module 188 may act as a facilitating module between the various sub-tracking modules and the camera 170.

In some embodiments, the combination of these three aforementioned sub-trackers (e.g., CS sub-tracker module 182, DF sub-tracker module 184, and OF sub-tracker module 186) can be combined to successfully track the eye and generate a solution that is robust enough to resolve the aforementioned problems of conventional eye trackers. Of note, unlike conventional eye-tracking methods, none of the sub-trackers described require the recognition of the entire face, and thus only a portion of the face (including the eyes) need be available in the FOV in order for the methods of the present disclosures to succeed. Furthermore, the sub-trackers may not need to restart the process of detecting the eye prior to tracking if a face (or portion of the face) leaves the FOV and reenters the FOV at a later time. The combination of the three sub-trackers provides these advantages and further advantages such as lower power use and faster processing as compared to current techniques because the entire face need not be tracked all the time.

The system 100 may also include more databases 190. The databases 190 may be operable to store the positive and negative datasets described above. The various sub-trackers may interface with the one or more databases 190, via eye-tracking module 188, to access the positive and negative datasets.

Figure 2:
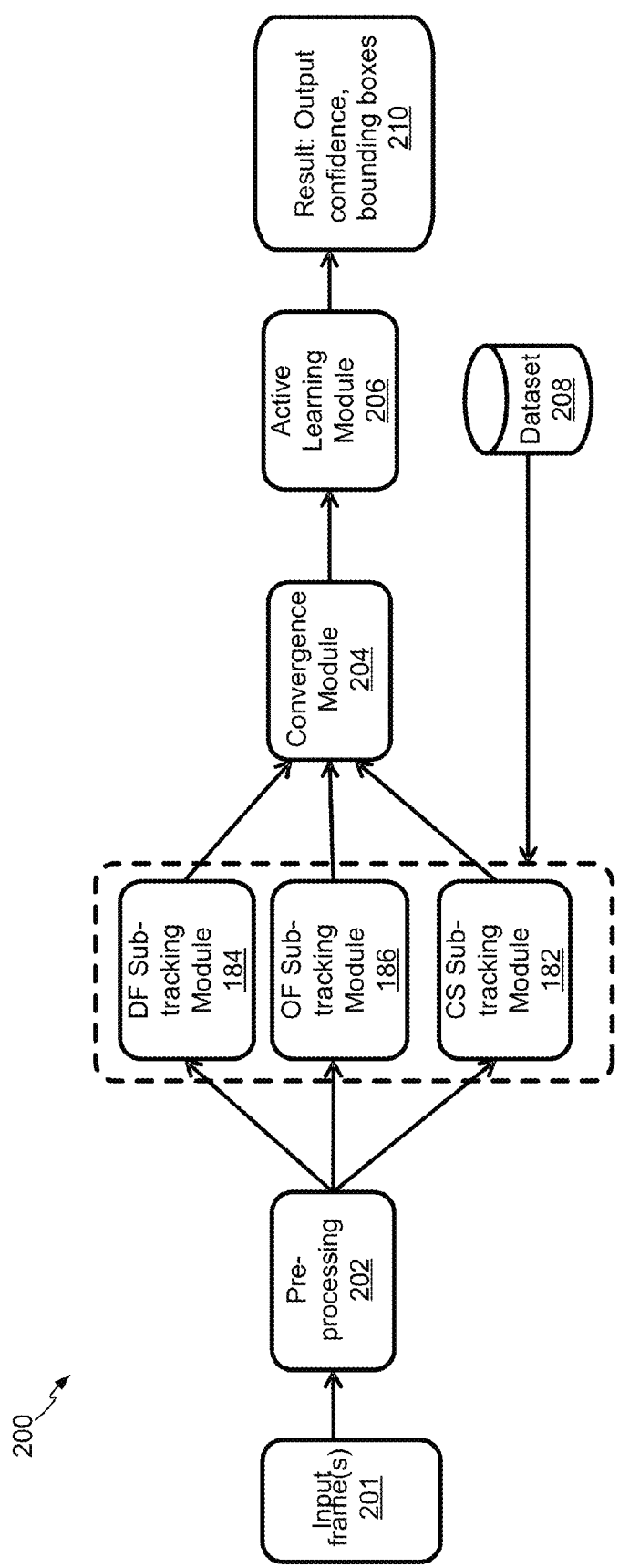
FIG. 2 illustrates an example process flow of a high-level architecture and framework of a forest sensing-based eye tracker, according to some embodiments.

FIG. 2 illustrates an example process flow 200 of a high-level architecture and framework of a forest sensing-based eye tracker, according to some embodiments. The process flow 200 begins with one or more input frames 201. The input frame(s) 201 may be captured by the camera 170 (FIG. 1). Upon capturing the input frame(s) 201, the input frame(s) may be used in a pre-processing step 202. The pre-processing step 202 may be executed in order to prepare each image frame(s) 201 for various image processing steps performed by each sub-tracker (e.g., CS sub-tracker module 182, DF sub-tracker module 184, and OF sub-tracker module 186). These various image processing steps can include, but is not limited to, conversion to grey scale, creation of a number of scaled images for the OF sub-tracker module 186, etc. In some embodiments, the pre-processing step 202 may be performed by the eye-tracking module 188. Upon completion of the pre-processing step 202, the pre-processed image frame(s) may be provided to, or accessed by, the various sub-tracking modules. In some embodiments, the eye-tracking module 188 may provide or grant access to the various image frame(s) to the various sub-tracking modules.

The CS sub-tracker module 182 may track the iris portion of the eye within the image frame(s). The CS sub-tracker module 182 may build a dataset of images representing what the eye is likely to look like (called a "positive dataset"), and another dataset of images representing what the eye is likely to not look like (called a "negative dataset"). The combination of a positive and negative dataset allows the CS sub-tracker module 182 to more easily distinguish what part of the image frame(s) is likely to be the eye compared to everything else within the image frame(s). The positive and negative datasets can be accessed and compared to image data in later frames to quickly recognize what parts of the image are likely to be the eye and what parts are not. In some embodiments, the positive and negative datasets focus on a positive and negative identification, respectively, of the iris portion of the eye itself.

The DF sub-tracker module 184 may generate a portion of the face within the image frame(s) that includes at least one eye and the surrounding region with consistent features therein (such as skin, eye brows, nose-bridge, glasses frame). This may be referred to as an "intersection bounding box" or "encompassing bounding box." The intersection bounding box need not include the entire face. In some embodiments, the DF sub-tracker module 184 may generate a separate intersection bounding box for each eye. For example, a first generated intersection bounding box may encompass the left eye within the image frame(s) and a second generated intersection bounding box may encompass the right eye within the image frame(s).

The OF sub-tracker module 186 may detect motion in the image frame(s). The OF sub-tracker module 186 may compare differences between pairs of images, and thus may not need to generate any positive or negative datasets. This OF sub-tracker module 186 may be used to quickly identify where the eyes have moved to generally, particularly if there are drastic changes in the eyes' positions from one frame to the next.

The various sub-tracker modules may use data from the dataset 208 as part of the analysis performed on the image frame(s). The dataset 208 may be stored within the one or more databases 190 (FIG. 1) and include the positive and negative datasets.

Upon analysis and processing through each of the sub-tracker modules, as described above, each sub-tracking module (e.g., CS sub-tracker module 182, DF sub-tracker module 184, and OF sub-tracker module 186) may generate a high confidence position of the eye within the image frame(s) or a series of high confidence positions, which are then fed into the convergence module 204. The high confidence position of the eye may indicate the most likely location of the eye(s) in the image frame(s). In some embodiments, the image frame(s) may be image frame(s) that are subsequent to prior image frame(s). During the convergence phase, the convergence module 204 may intelligently combine results of the analysis and processing by each of the sub-trackers to create a final decision. The final decision may reflect the determined location of the eyes within the image frame(s).

The convergence module 204 may then report results 210 of the final decision. The results may also be used to continually learn, via an active learning module 206, new properties of the object being tracked in order to improve tracking with time and update the dataset 208. The learning ability may provide tolerance of changes due to, but not limited to, orientation, deformation, lighting, occlusion, etc. The results 210 of the final decision may be used an application, or any other component, of the system 100 (FIG. 1). In some embodiments, the results 210 of the final decision may be used by an external system.

It can be appreciated that the DF sub-tracker module 184 and OF sub-tracker module 186 may be optimized at tracking the intersection reliability and fast. However, they may not be as reliable at tracking a tiny iris. The DF sub-tracker module 184 can recover the intersection since it does not require a seed location in the previous frame like the OF sub-tracker module 186 and CS sub-tracker module 182 may require. The CS sub-tracker module 182 may be optimized for reliably tracking a tiny iris. However, it may not be able to reliably recover iris tracking and may not be able to differentiate two very similar iris without the verification of the intersection. The OF sub-tracker module 186 may be optimized for tracking an object in motion provided that the object does not move too fast (causing a blur) of if tracking was lost in the previous frame. The CS sub-tracker module 182 may be reliable for small objects with consistent color but a chance of losing tracking may exist. As such, the CS sub-tracker module 182 may not be powerful enough to provide adequate tracking results. However, the combination of the abilities of the CS sub-tracker module 182, DF sub-tracker module 184, and OF sub-tracker module 186 may be combined to provide accurate, reliable, and more robust tracking results.

Figure 3:
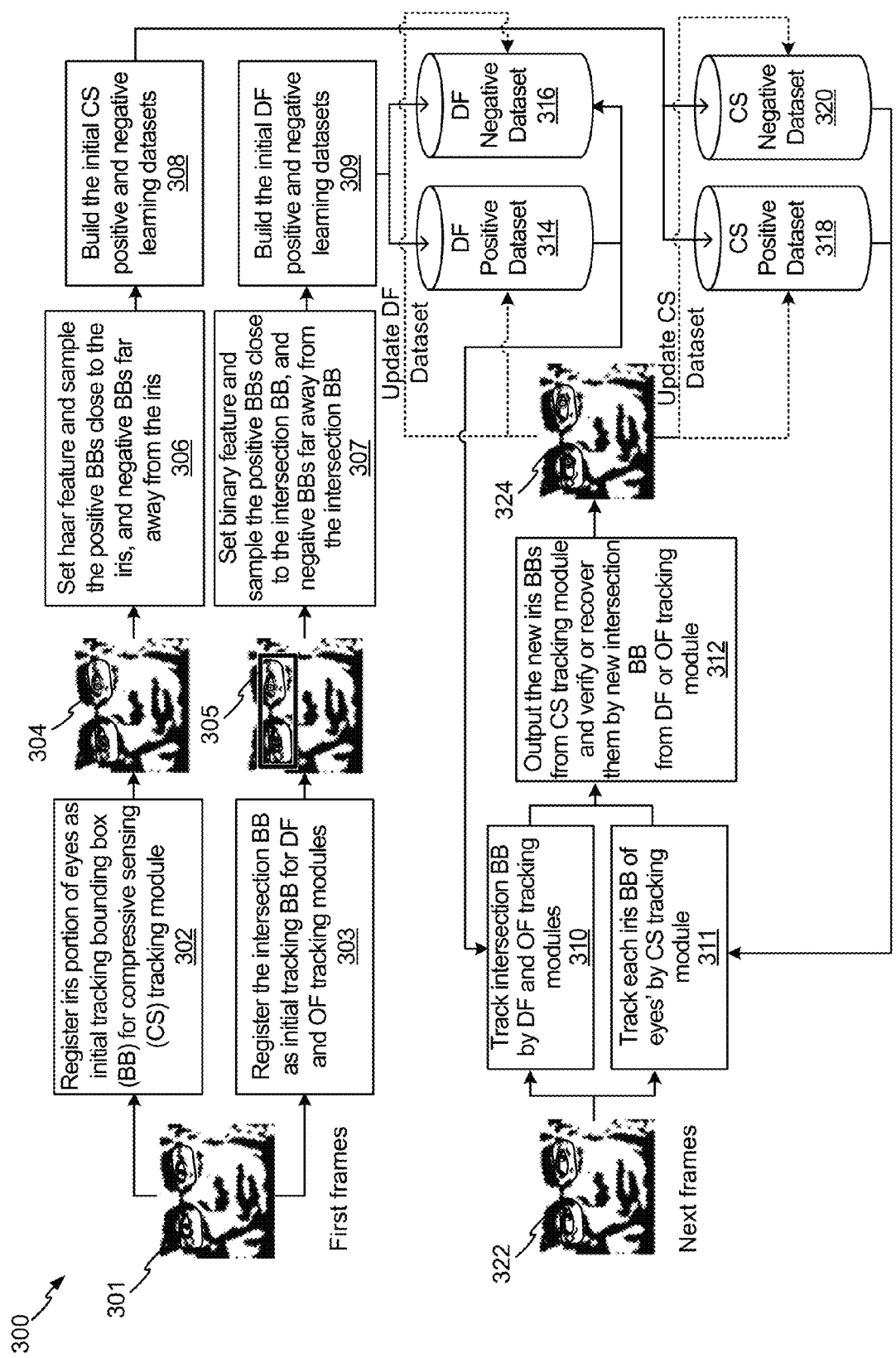
FIG. 3 illustrates a flow diagram for utilizing iris-tracking, intersection bounding box tracking, and motion tracking techniques for eye-tracking, according to some embodiments.

FIG. 3 illustrates a flow diagram 300 for utilizing iris-tracking, intersection bounding box tracking, and motion tracking techniques for eye-tracking, according to some embodiments. Here, processes for the iris-tracking (performed by CS sub-tracker module 182 (FIG. 1)) and intersection bounding box tracking (performed by DF sub-tracker module 184 (FIG. 1) and OF sub-tracker module 186 (FIG. 1)) techniques are shown. The process may start with an initial frame with known positions of the eyes, and continues on to build the positive and negative datasets as previously mentioned. The motion tracking (performed by the OF sub-tracker module 186 (FIG. 1)) technique is also incorporated based on comparison of data from the next frame, and is not included in the initial steps as shown because no datasets need be built for the motion tracking technique.

At step 301, the iris is detected within the first image frame and the iris' locations are passed to the eye-tracking framework. The iris detection may be accomplished a number of different ways. Typically, current solutions accomplish iris detection by determining the face location with a face detector and using additional filters to find the eyes. This process is normally very slow and requires the entire face to be within the FOV. This and other iris detection techniques are well known in the art. In the present embodiment, once the iris location is determined, there may no longer be a need for iris detection. Each iris' location may be encompassed by a small bounding box and the bounding boxes may be passed to the eye-tracking framework for initialization.

At step 302, based on the inputted iris' location in the first frames (initialization frames), the framework registers the iris portion of the eyes' as the initial tracking bounding box for the CS sub-tracker module 182 (FIG. 1). The initial tracking bounding box for the CS sub-tracker module 192 (FIG. 1) is depicted in image 304. At step 303, the framework registers the intersection bounding box as the initial tracking bounding box for the DF sub-tracker module 184 (FIG. 1) and the OF sub-tracker module 186 (FIG. 1). As described above, the intersection bounding box may include at least one eye and the surrounding region with consistent features therein (such as skin, eye brows, nose-bridge, glasses frame). In some embodiments, the intersection bounding box may include both eyes and their surrounding regions. An example of the intersection bounding box for the DF sub-tracker module 184 (FIG. 1) and the OF sub-tracker module 186 (FIG. 1) is depicted in image 305.

At step 306, positive bounding boxes close to the iris and negative bounding boxes away from the iris are sampled. Haar features are used to characterize the sampled bounding boxes (positive bounding boxes and negative bounding boxes) in order to build the initial CS positive dataset 318 and CS negative dataset 320 (step 308). The CS positive dataset 318 and CS negative dataset 320 may be learning datasets that can be updated in real-time (described in further detail below).

At step 307, positive bounding boxes close to the intersection bounding box and negative bounding boxes away from the intersection bounding box are sampled. Binary features are used to characterize the sampled bounding boxes (positive bounding boxes and negative bounding boxes) in order to build the initial DF positive dataset 314 and DF negative dataset 316 (step 309). Building the initial DF positive dataset 314 and DF negative dataset 316 can include analyzing the positive bounding boxes close to the intersection bounding box and the negative bounding boxes away from the intersection bounding box. Binary features, which are pixel intensity differences, may be used to characterize the sampled bounding boxes to build the initial DF positive dataset 314 and DF negative dataset 316. The DF positive dataset 314 and DF negative dataset 316 may be learning datasets that can be updated in real-time (described in further detail below).

In some embodiments, there may be two DF related bounding boxes, where each contains image data around a single eye. This technique may improve tracking for a single eye, e.g., when the other eye is covered or not within the FOV. The term "intersection bounding box" may refer to an intersection bounding box including two-eyes or only one eye.

At step 310, during the regular ongoing tracking phase (post initialization), the intersection bounding box may be tracked by the DF sub-tracker module 184 (FIG. 1) and the OF sub-tracker module 186 (FIG. 1). At step 311, during the regular ongoing tracking phase (post initialization), the iris bounding boxes may be tracked by the CS sub-tracker module 182 (FIG. 1). Steps 310 and 311 may track the intersection bounding box and iris bounding boxes on subsequent image frame(s), as shown in example image 322.

At step 312, the new iris bounding boxes may be outputted from the CS sub-tracker module 182 (FIG. 1) and the new intersection bounding boxes may be outputted from the DF sub-tracker module 184 (FIG. 1) and the OF sub-tracker module 186 (FIG. 1). The outputted iris bounding boxes and outputted intersection bounding box may be used to verify the results of the new iris bounding boxes. In cases where the CS sub-tracker module 182 (FIG. 1) loses tracking (e.g., the eyes leave the FOV), the DF sub-tracker module 184 (FIG. 1) can scan the entire image frame(s) and recover the intersection bounding box. The CS sub-tracker module 182 (FIG. 1) may then be used to recover the iris (as depicted in example image 324).

The DF positive dataset 314, DF negative dataset 316, CS positive dataset 318, and CS negative dataset 320 may then be updated based on the analysis of the subsequent image frame(s) (e.g., image frame 322) by the various sub-tracker modules. In this sense, the DF positive dataset 314, DF negative dataset 316, CS positive dataset 318, and CS negative dataset 320 are learning datasets that may improve upon each subsequent image frame(s).

Figure 4:
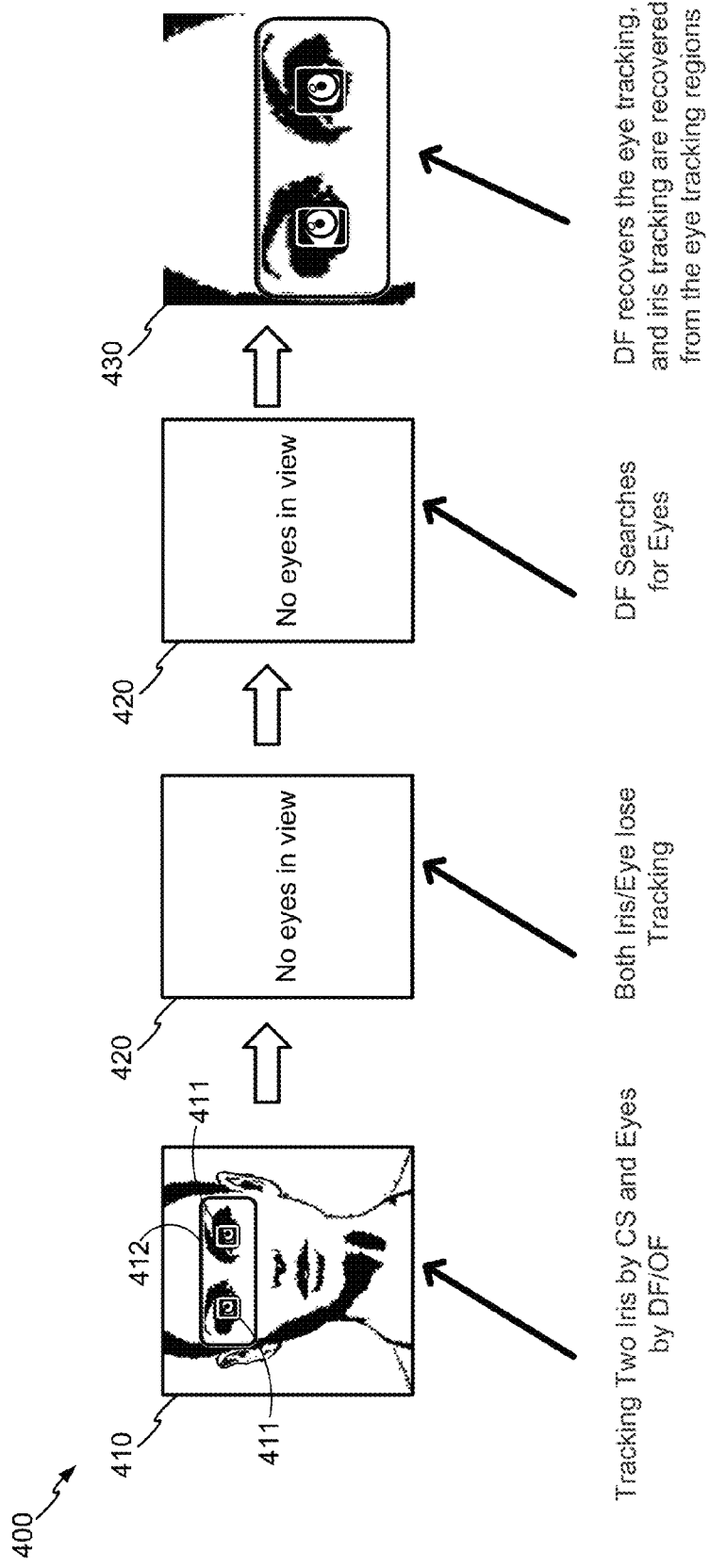
FIG. 4 illustrates an example of eye-tracking recovery, according to some embodiments.

FIG. 4 illustrates an example of eye-tracking recovery, according to some embodiments. Here, the figure shows how the eye-tracker recovers iris tracking when eye/iris tracking fails. One common reason for eye/iris tracking to fail is that the eye or eyes leaves the FOV. Typically, the eye or eyes may return to the FOV shortly thereafter, e.g., a user may place his/her mobile device down momentarily and then pick it up again.

In the initial image frame 410, two iris are tracked using bounding boxes via the CS sub-tracker module 182 (FIG. 1) and the eyes are tracked using intersection bounding box via the DF sub-tracker module 184 (FIG. 1) and the OF sub-tracker module 186 (FIG. 1). These methods are described in detail above.

Subsequently, the iris and/or eye tracking may be lost in the next image frame 420. Typically, this may be the result of a user action as described above. The DF sub-tracker module 184 (FIG. 1) may search for eyes within the next image frame 420 but may not find any eyes in the FOV. At some point thereafter, the iris and or/eye may return within the FOV in a subsequent image frame 430. For example, the user may reposition the mobile device in front of them. The intersection bounding box is used to search for the eyes as the CS sub-tracker module 182 (FIG. 1) does not itself have recovering capabilities. This detection is very fast and may use the learned DF positive dataset 314 (FIG. 3) and DF negative dataset 316 (FIG. 3) to recover the eye or eyes without confusion of another person's face. The iris tracking may then be recovered from the recovered eye tracking regions. It can be appreciated that by using the DF positive dataset 314 (FIG. 3) and DF negative dataset 316 (FIG. 3) to recover the eye or eyes, the eye-tracking system may be using unique user features within the subsequent image frame 430 (such as skin, eye brows, nose-bridge, glasses frame, etc.).

It can be appreciated that the learning datasets built in the beginning by the DF sub-tracker module 184 (FIG. 1) can be used to recover the intersection bounding box of the eyes because the DF sub-tracker module 184 (FIG. 1) can perform fast and reliable detection of intersection once the user re-renters the FOV, and doesn't require the entire face to be within the FOV.

It can be appreciated that the intersection bounding box may serve various purposes. The intersection bounding box may be used to verify the iris based on biometric data. Additionally, the intersection bounding box may be used to recover the iris tracking. Further, the intersection bounding box may be used to limit the tracking window of each iris.

Figure 5:
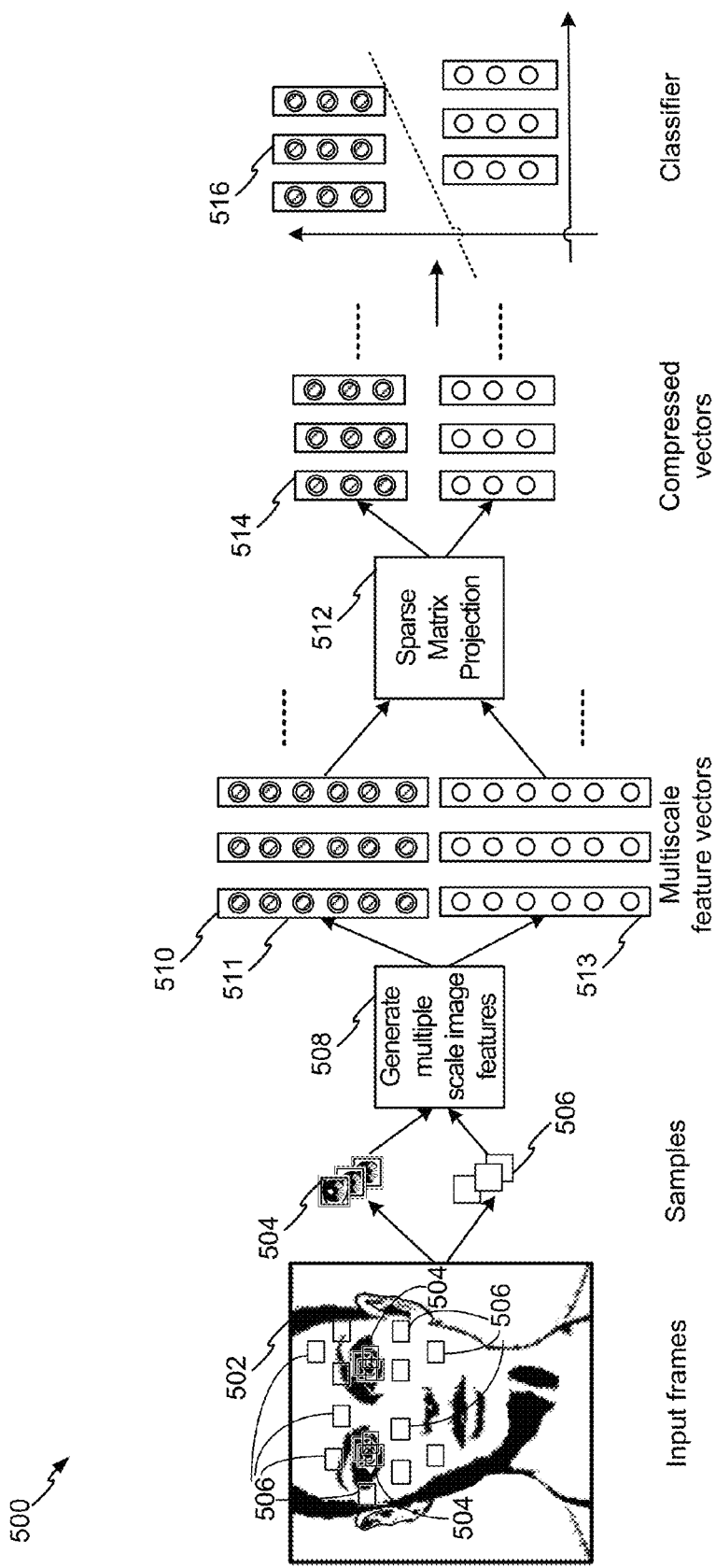
FIG. 5 illustrates details of the iris-tracking technique performed by the CS sub-tracker module.

FIG. 5 illustrates details of the iris-tracking technique performed by the CS sub-tracker module 182. Here, details are described with regard to the CS sub-tracker module 182 generating positive and negative samples of the iris. The figure depicts both positive samples 504 and negative samples 506. In some embodiments, the positive samples 504 may be generated by randomly sampling portions of the image near to the (known) location of the eye(s). In subsequent input frames, the iris-tracker may then know that the iris should resemble these samples. Similarly, in some embodiments, the negative samples 506 may be generated by randomly sampling portions of the image farther away from the (known) location of the eye(s). Here, samples of the person's skin and eyebrows may be recorded in the negative database. Thus, the iris-tracker may then know in subsequent images that portions that resemble the person's skin and/or eyebrows may not be likely to be the eye(s).

These techniques may be carried out using compressive sensing theory. For image signal processing, compressive sensing theory allows the entire signal to be determined from relatively few measurements. Johnson-Lindenstrauss lemma states that with high probability the distances between the points in a vector space can be preserved if they are projected onto a randomly selected subspace with suitably high dimensions. Therefore, in high-dimensional image space, if the random matrix R satisfies the Johnson-Lindenstrauss lemma, x can be reconstructed with minimum error from v with high probability if x is compressive, which means v can preserve almost all the information in x. This theory can help in analyzing the high-dimensional image signals via its low-dimensional random projections. Using a very sparse random matrix R 512 in equation (1) not only satisfies the Johnson-Lindenstrauss lemma, but also can be efficiently computed for real-time eye/iris tracking.

$$v = Rx \quad (1)$$

A typical random matrix is the random Gaussian matrix $R \in R^{n \times m}$ where $r_{ij} \sim N(0,1)$. However, if m is large and the matrix is dense, the computation and memory are still large. Therefore, a very sparse random matrix 512 is adopted with entries defined as $$r_{ij} = \sqrt{s} \times \begin{cases} 1 & \text{with probability } \frac{1}{2s} \\ 0 & \text{with probability } 1 - \frac{1}{s} \\ -1 & \text{with probability } \frac{1}{2s} \end{cases} \quad (2)$$

Achlioptas, D., "*Database-friendly random projections: Johnson-Lindenstrauss with binary coins*". J. Comput. Syst. Sci 66, 671-687 (2003), has proven that this type of matrix with s=2 or 3 satisfies the Johnson-Lindenstrauss lemma. It may be very easy to compute this matrix, which requires only a uniform random generator. When S=3, it is very sparse and two thirds of the computation can be saved. When $$S = \frac{m}{\log(m)},$$

the random projections are almost as accurate as the conventional random projections where $r_{ij} \sim N(0,1)$. If set $$S = \frac{m}{4},$$

and it makes a very sparse random matrix, which means the computational complexity is very low, and it is only needed to store the nonzero entries of R which makes the memory requirement also very light.

For each sample $z \in R^m$, its low dimensional representation is $v = (v_1, \ldots, v_n)^T \in R^n$ with m>>n. Assuming all elements in v are independently distrusted, they may be modeled with a native Bayes classifier:

$$H(v) = \log\left(\frac{\prod_{i=1}^{n} p(v_i \mid y=1) p(y=1)}{\prod_{i=1}^{n} p(v_i \mid y=0) p(y=0)}\right) = \sum_{i=1}^{n} \log\left(\frac{p(v_i \mid y=1)}{p(v_i \mid y=0)}\right) \quad (3)$$

Where it is assume uniform p(y=1)=p(y=0), and y∈{0,1} is a binary variable which represents the sample label. It may also be assumed that the conditional distributions $p(v_i|y=1)$ and $p(v_i|y=0)$ in the classifier H(v) to be Gaussian distributed for parameters $(\mu_i^1, \sigma_i^1, \mu_i^0, \sigma_i^0,)$ where $$p(v_i|y=1) \sim N(\mu_i^1, \sigma_i^1), \ p(v_i|y=0) \sim N(\mu_i^0, \sigma_i^0) \quad (4)$$

The parameters in (4) may be incrementally updated by (5):

$$\mu_i^1 \leftarrow \lambda \mu_i^1 + (1-\lambda)\mu^1$$
$$\sigma_i^1 \leftarrow \sqrt{\lambda(\sigma_i^1)^2 + (1-\lambda)(\sigma^1)^2 + \lambda(1-\lambda)(\mu_i^1 - \mu^1)^2} \quad (5)$$

Where $\lambda > 0$ is a learning parameter, and $$\mu^1 = \frac{1}{n}\sum_{k=0|y=1}^{n-1} v_i(k),$$

$$\sigma^1 = \sqrt{\frac{1}{n}\sum_{k=0|y=1}^{n-1}(v_i(k)-\mu^1)^2}$$

Therefore, from equation (3), a few sample BBs may be found with the maximal likelihood estimation. Then, the new tracking BB can be outputted by clustering them. After that, from equation (5), =CS learning dataset (CS positive dataset 318 and CS negative dataset 320) can be updated by positive samples 504 and negative samples 506.

Additionally, FIG. 5 illustrates one of the primary components of the theory used by the CS sub-tracker module 182 (FIG. 1). In input frame 502, both positive bounding boxes 504 that are close to the iris in the previous frame and negative bounding boxes 506 far away from the iris in previous frame are sampled. In block 508, multiple scale image features are generated from the sampled positive bounding boxes 504 and negative bounding boxes 506. Subsequently, multiple scale image features 508, including both positive feature vectors 511 and negative feature vectors 513 are saved, and are used as the input to the sparse matrix projection 512. As mentioned above, a very sparse measurement matrix can meet the restricted isometry property, and facilitate efficient projection from the image feature vector space to a low dimensional compressed sensing subspace. Therefore, both positive and negative feature vectors are projected or compressed 514 with the same sparse measurement matrix and discriminated by a Bayes classifier described above. The learned classifier 516 is used to classify the sampled bounding box of subsequent frames to return the highest confidence new eyes' location, which is described with respect to FIG. 7.

Figure 6:
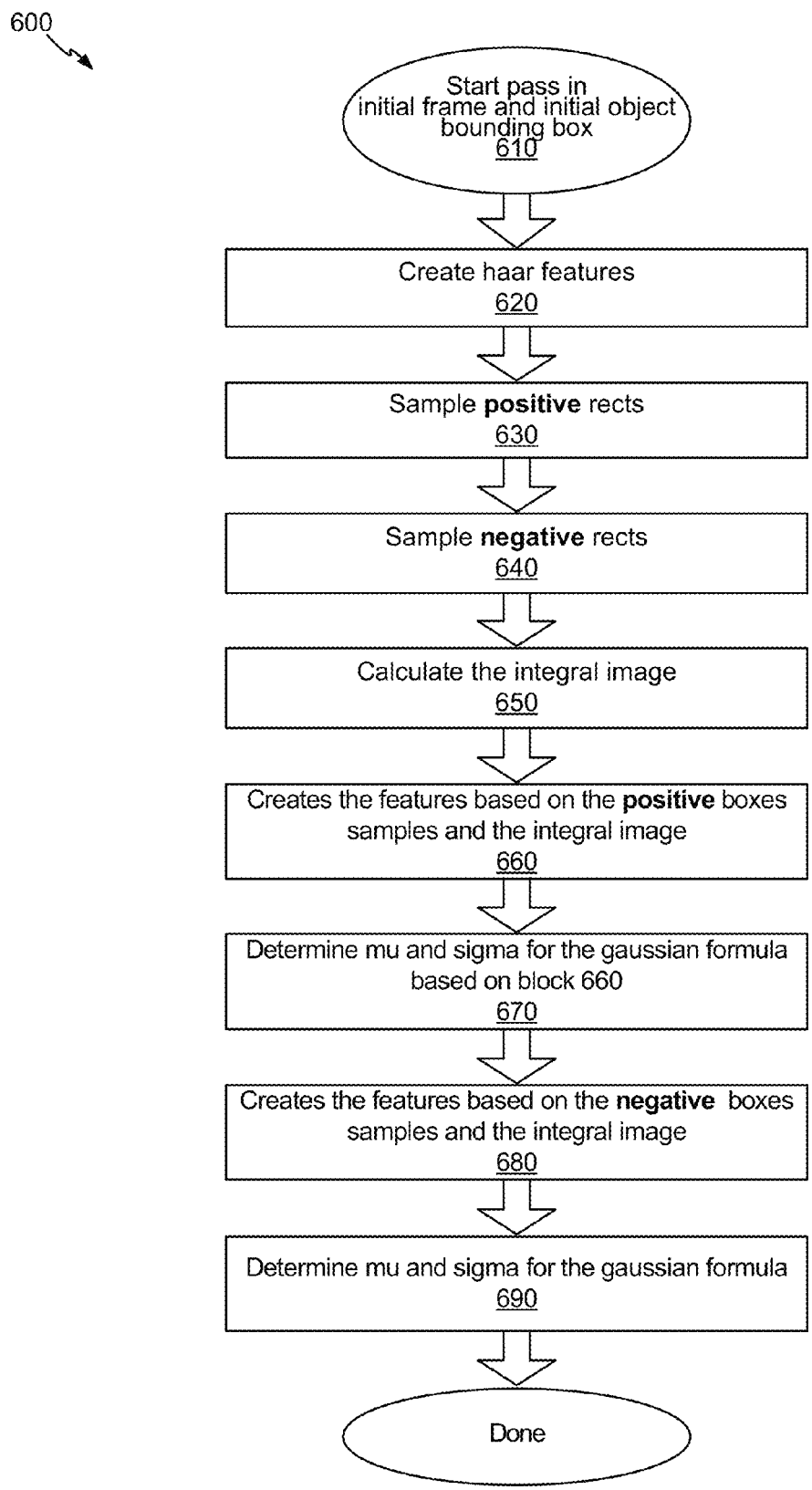
FIG. 6 illustrates a flowchart of an exemplary method of initializing iris-tracking via the CS sub-tracker module, according to some embodiments.

FIG. 6 illustrates a flowchart 600 of an exemplary method of initializing iris-tracking via the CS sub-tracker module, according to some embodiments. In box 610, during the initialization phase, the iris detector passes in the initial bounding box of each iris so the iris location is known such that the CS sub-tracker module does not need to 'discover the new' iris location. For example, the number of features we selected may be 10 with between 2-4 bounding boxes each. It can be appreciated that these numbers are purely exemplary and can be changed.

In block 620, the ten features may be picked for creating Haar features. Each feature may be a set of rectangles having a weight. Each rectangle may be randomly picked from 0 to width/height. The start coordinates may be between 0 and object rectangle. The 'object' may be the initial object location and dimensions. The number of rectangles may be randomly selected, e.g., between 2-4. The weight can be determined using the following formula: −1^ (random(0,2)/ sqrt(num_rect).

In block 630, boxes may be created around the initial bounding box for sampling the positive samples. Of the created boxes, a random number of boxes may be selected up to maxSampleNum. The boxes may have the width and height randomly selected between 0 and width and height of the initial bounding box and an initial location based on the for loops of (i,j) (assuming the box is selected). The selection criteria may be based on the boxes having a Euclidean distance from 0 to some radius (e.g., 16 pixels). These boxes may then be recorded as an array samplePositiveBox with samplePositiveBoxSize number of boxes. In some cases, if the array is full the remaining boxes that meet the criteria may be dropped.

In block 640, boxes may be created around the initial bounding box for sampling the negative samples. Of the created boxes, a random number of boxes may be selected up to maxSampleNum. The boxes may have the width and height of the passed in initial bounding box and an initial location based on the for loops of (i j) (assuming the box is selected). It may be required that the selected boxes have a Euclidean distance from some minimum distance to some maximum distance. It can be appreciated that this differs from block 630 in that the minimum distance is not 0. These boxes may then be recorded as an array sampleNegativeBox with sampleNegativeBoxSize number of boxes.

In block 650, all of the previous pixel values from the top and left of the current pixel may be summed together. The resulting value may be stored in the current pixel. This may calculate the integral image.

In block 660, for each entry in the 10 feature matrix, the integral value may be obtained of each rectangle picked in block 630. Each value may be stored in a temporary sampleFVBuf. This may create the features based on the positive box samples and the integral image.

In block 670, mu and sigma for the Gaussian formula may be determined based on block 660. The integral values for each row of the feature matrix may be used to calculate the standard deviation and mean value for the row. Accordingly, this may result in 1 standard deviation variable and 1 mean value per row (e.g., 10 values in total). These values may then be used to calculate sigma and mu for each row (e.g., resulting in 10 sigma values and 10 mu values).

In block 680, features may be created based on the negative box samples and the integral image. For each entry in the 10 feature matrix, the integral value may be obtained of each rectangle picked in block 640. Each value may be stored in a temporary sampleFVBuf.

In block 690, mu and sigma may be determined for the Gaussian formula based on block 680. For each entry in the 10 feature matrix, a standard deviation and mean may be determined.

Figure 7:
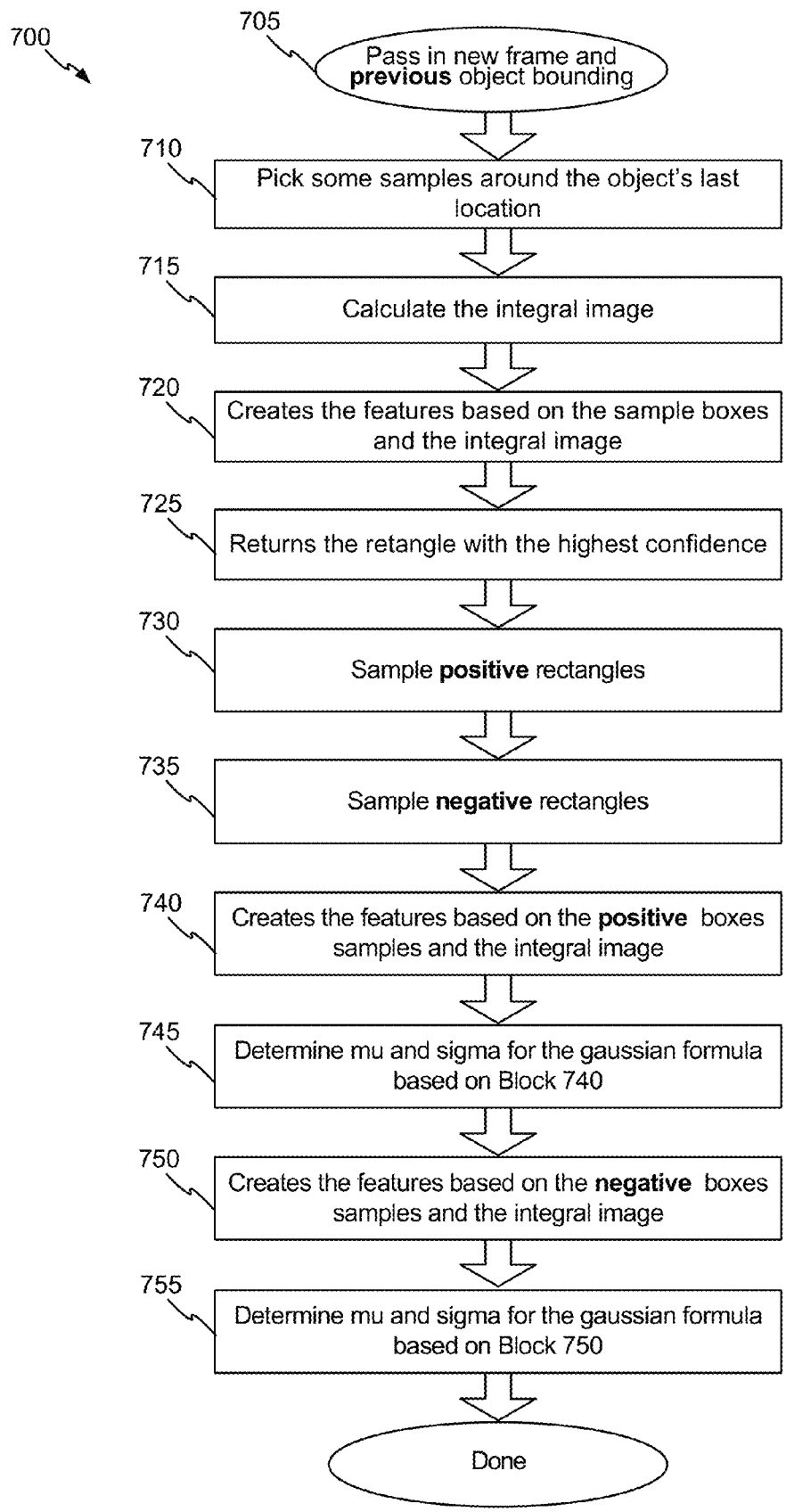
FIG. 7 illustrates a flowchart of an exemplary method of iris-tracking via the CS sub-tracker module, according to some embodiments.

FIG. 7 illustrates a flowchart 700 of an exemplary method of iris-tracking via the CS sub-tracker module, according to some embodiments. The iris location of the new frame may not be known but may be determined as a result of analysis by the CS sub-tracking module. In block 705, bounding boxes from the previous image frame may be used to provide a rough idea where the iris location is in order to seed the search. Additionally the new image frame may be passed in.

In block 710, a number of samples may be selected around the object's last location. Boxes may be created around the previous bounding boxes. This routine can create all the boxes within the search window and records the rectangle information. The boxes may have the width and height of the passed previous box and an initial location based on the for loops of (i,j). In some embodiments, it may be required that the selected boxes may have a Euclidean distance from 0 to some radius (e.g., 16 pixels). These boxes may be recorded as an array detectBox having detectBox-Size number of boxes.

In block 715, the integral image is calculated. This may be done by summing all the previous pixel values from the top and the left of the current pixel and storing the value in the current pixel.

In block 720, features may be created based on the sample boxes from block 710 and the integral image from block 715. For each of the features (e.g., 10 features), the integral value may be obtained for each rectangle selected in block 710 and each value may be stored in a temporary sampleFVBuf.

In block 725, the rectangle with the highest confidence may be returned. For each of the features (e.g., 10 features), a Bayesian probability calculation may be employed according to the following formula: $P(B|A)=P(B)P(AB)/P(A)$. The positive and negative sigmas and mus may be used when using the Gaussian probability function to pick the most likely bounding box result based on the input from step 720.

In block 730, boxes may be created around the newly found bounding box for sampling the positive samples. Of the created boxes, a random number of boxes may be selected up to maxSampleNum. The boxes may have the width and height randomly selected between 0 and width and height of the passed in bounding box and an initial location based on the for loops of (i,j) (assuming the box is selected). The selection criteria may be based on the boxes having a Euclidean distance from 0 to some radius (e.g., 16 pixels). These boxes may then be recorded as an array samplePositiveBox with samplePositiveBoxSize number of boxes.

In block 735, boxes may be created around the initial bounding box for sampling the negative samples. Of the created boxes, a random number of boxes may be selected up to maxSampleNum. The boxes may have the width and height of the passed in initial bounding box and an initial location based on the for loops of (i,j) (assuming the box is selected). It may be required that the selected boxes have a Euclidean distance from some minimum distance to some maximum distance. It can be appreciated that this differs from block 730 in that the minimum distance is not 0. These boxes may then be recorded as an array sampleNegativeBox with sampleNegativeBoxSize number of boxes. For each of the features (e.g., 10 features), the integral value of each rectangle may be stored in a temporary sampleFVBuf.

In block 740, the features may be created based on the positive box samples and the integral image. For each of the features (e.g., 10 features) the integral value of each rectangle picked may be obtained and stores each value in a temporary sampleFVBuf.

In block 745, mu and sigma are determined for the Gaussian formula. For each of the features (e.g., 10 features) a standard deviation may be performed and a mean may be obtained. The mean may be adjusted for each feature based on this new value as well as the rate at which it should learn (learnRate). That is, it can be appreciated that the new values may only be 15% used in order to avoid any drastic changes.

In block 750, the features may be created based on the negative box samples and the integral image. For each of the features (e.g., 10 features) the integral value of each rectangle picked may be obtained and stores each value in a temporary sampleFVBuf.

In block 755, mu and sigma are determined for the Gaussian formula based on step 750. For each of the features (e.g., 10 features) a standard deviation may be performed and a mean may be obtained. The mean may be adjusted for each feature based on this new value and rate at which it should learn (learnRate). That is, it can be appreciated that the new values may only be 15% used in order to avoid any drastic changes.

Figure 8:
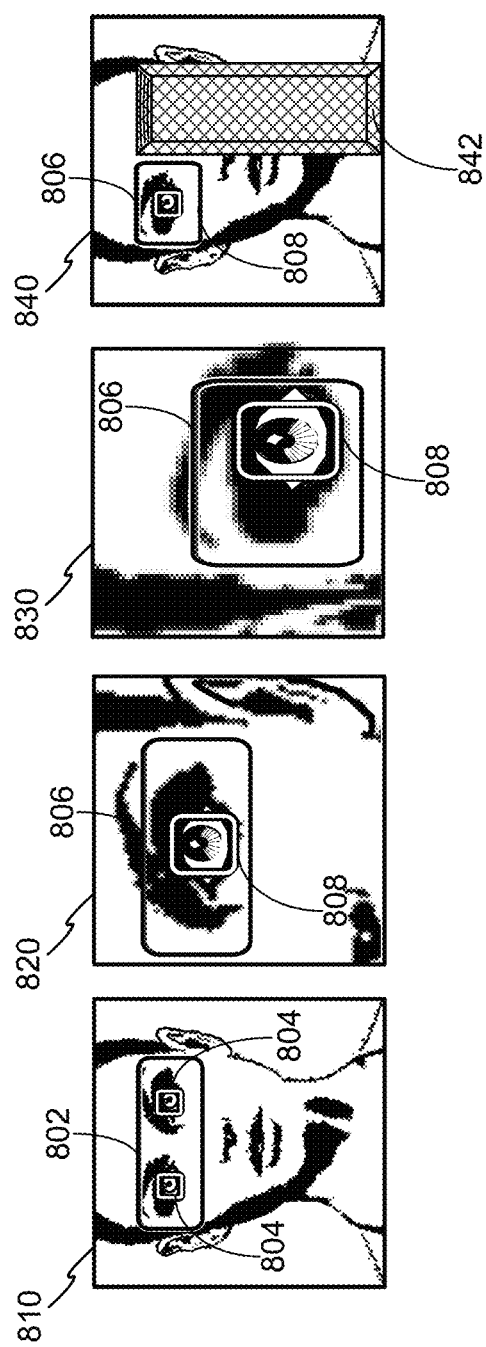
FIG. 8 illustrates eye-tracking when a portion of a user's face is occluded, according to some embodiments.

FIG. 8 illustrates eye-tracking when a portion of a user's face is occluded, according to some embodiments. Here, the figure illustrates four image frames: frame one 810, frame two 820, frame three 830, and frame for 840. In frame one 810, both of the user's eyes are within the FOV, and a single intersection bounding box 802 is created encompassing both the eyes and features surrounding the eyes. Additionally, two individual iris bounding boxes 804 are created, each box encompassing one of the eyes. This bounding box technique shown in frame one 810 illustrates the techniques described above. However, often times, the user's face may be very close to the system 100 (FIG. 1) such that only a portion of the face or only one eye is within the FOV of the camera 170 (FIG. 1).

Existing solutions may not be able to accurately track the iris as they rely solely on the entire face being within the FOV for tracking purposes. In contract, system 100 (FIG. 1) may only require that at least one eye be within the FOV and can tolerate any occlusion of the user's face. In scenarios where only one of the eyes is within the FOV, the system 100 (FIG. 1) may still be able to track the iris because the intersection can be registered based on one eye only. In cases where two eyes are within the FOV, the intersection may be the crossover regions on the face. In cases where only one eye is within the FOV, the one eye can be tracked, discovered, and recovered independently of the second eye.

In frame two 820, only a portion of the face and one eye are within the FOV. The CS sub-tracker module 182 (FIG. 1) may track the single iris and encompass it within an iris bounding box 808. Similarly, the DF sub-tracker module 184 (FIG. 1) may generate a single intersection bounding box 806 encompassing the single eye and features surrounding the single eye, using the methods and techniques described above. The features encompassed by the intersection bounding box may depend on how much of the face is within the FOV. In frame three 830, the face is much closer to the camera 170 (FIG. 1) and thus much less of the face is within the FOV. Similar to frame two 820, the CS sub-tracker module 182 (FIG. 1) may track the single iris and encompass it within an iris bounding box 808 and the DF sub-tracker module 184 (FIG. 1) may generate a single intersection bounding box 806 encompassing the single eye and features surrounding the single eye. It can be appreciated that the intersection bounding box 806 and iris bounding box 808 in frame three 830 may be of a different size than the intersection bounding box 806 and iris bounding box 808 in frame two 820. The difference in size may be due to the difference in the size of the face within the FOV.

Frame four 840 illustrates the user's face partially occluded by an object 842. Even though a majority of the face is within the FOV such that two eyes would typically be detected, since almost half of the face and one eye is occluded by the object 842, only a single eye may be detected by the system 100 (FIG. 1). However, the system 100 (FIG. 1) may still accurately track the single as described above. As described above, the CS sub-tracker module 182 (FIG. 1) may track the single iris and encompass it within an iris bounding box 808 and the DF sub-tracker module 184 (FIG. 1) may generate a single intersection bounding box 806 encompassing the single eye and features surrounding the single eye.

It can be appreciated that the eye-tracking system disclosed herein may recover the iris if it leaves and re-enters the FOV. The recovery may be based on the intersection bounding box 806 outputted from the DF sub-tracker module 184 (FIG. 1). That is, the eye does not need to be detected again as may be required by existing solutions.

Figure 9:
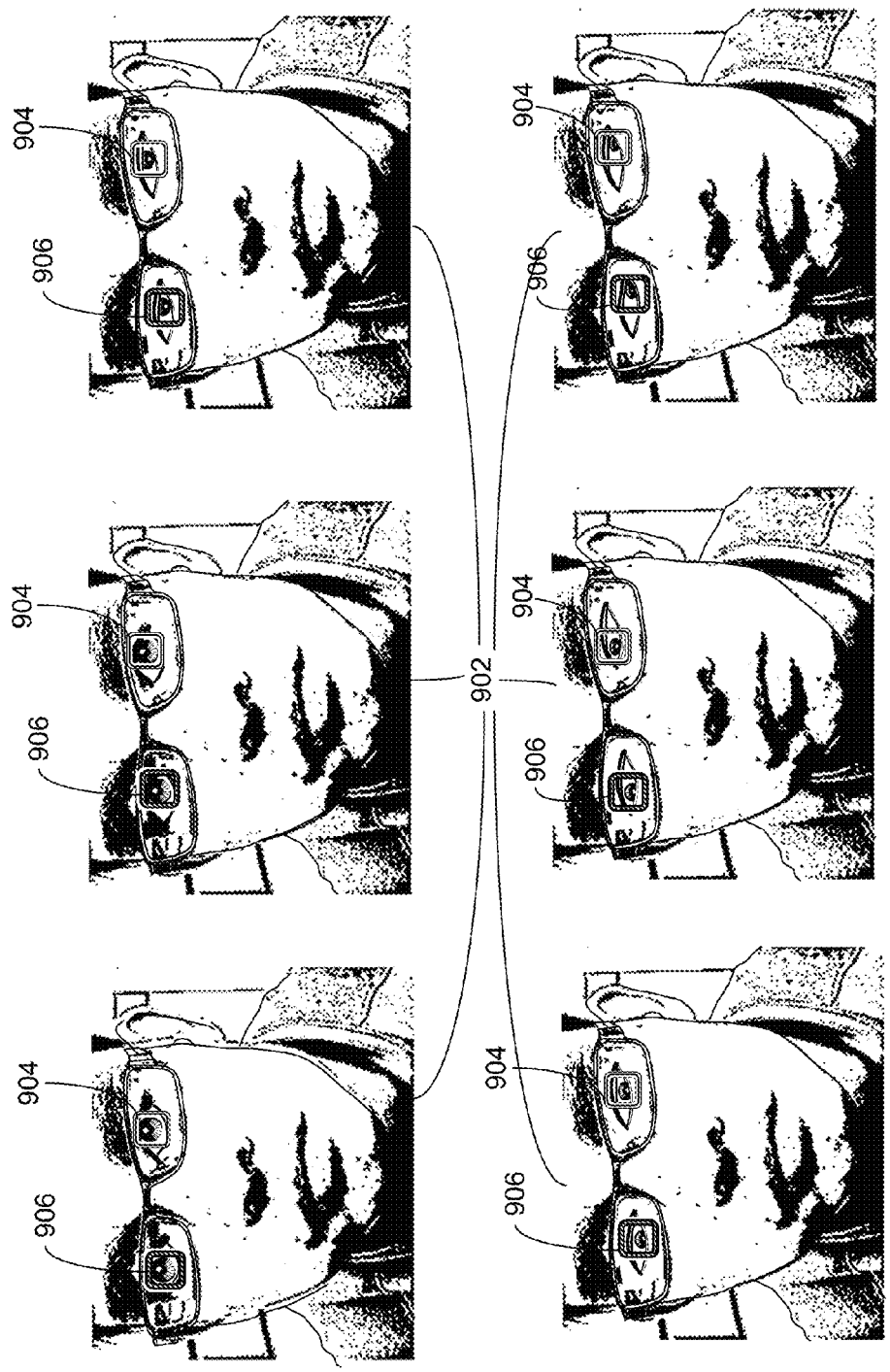
FIG. 9 illustrates eye-tracking over a plurality of frames, according to some embodiments.

FIG. 9 illustrates eye-tracking over a plurality of frames 902. The figure shows six different frames 902. Each frame 902 includes a user's face and two eyes within the FOV. The CS sub-tracker module 182 (FIG. 1) may track the iris portion of the eye within the frames 902. As described above, the CS sub-tracker module 182 (FIG. 1) builds a dataset of images representing what the eye is likely to look like (called a "positive dataset"), and another dataset of images representing what the eye is likely to not look like (called a "negative dataset"). The combination of a positive and negative dataset allows the CS sub-tracker module 182 (FIG. 1) to more easily distinguish what part of the image is likely to be the eye compared to everything else. The positive and negative datasets can be accessed and compared to image data in later frames to quickly recognize what parts of the image are likely to be the eye and what parts are not. In some embodiments, the positive and negative datasets focus on a positive and negative identification, respectively, of the iris portion of the eye itself.

Also, as previously discussed, the DF sub-tracker module 184 (FIG. 1) may be configured to generate a portion of the face that includes at least one eye and the surrounding region with consistent features therein (such as skin, eye brows, nose-bridge, glasses frame). This may be referred to as an "intersection bounding box" or "encompassing bounding box."

Additionally, also as previously discussed, the OF sub-tracker module 186 (FIG. 1) may be optimized to detect motion in the frames 902. The OF sub-tracker module 186 (FIG. 1) may compare differences between pairs of frames. This OF sub-tracker module 186 (FIG. 1) may be used to quickly identify where the eyes have moved to generally, particularly if there are drastic changes in the eyes' positions from one frame to the next.

The combination of the three sub-tracking modules may allow for accurate iris tracking over the frames 902. As can be seen, a left iris bounding box 904 encompasses the left iris and a right iris bounding box 906 encompasses the right iris. As the iris change locations over the plurality of frames 902, the left iris bounding box 904 and the right iris bounding box 906 also change locations to track the corresponding iris. It can be appreciated that the tracking is accurate even if the full iris is not within the FOV, e.g., when the iris is partly occluded by the eyelid, etc.

Figure 10:
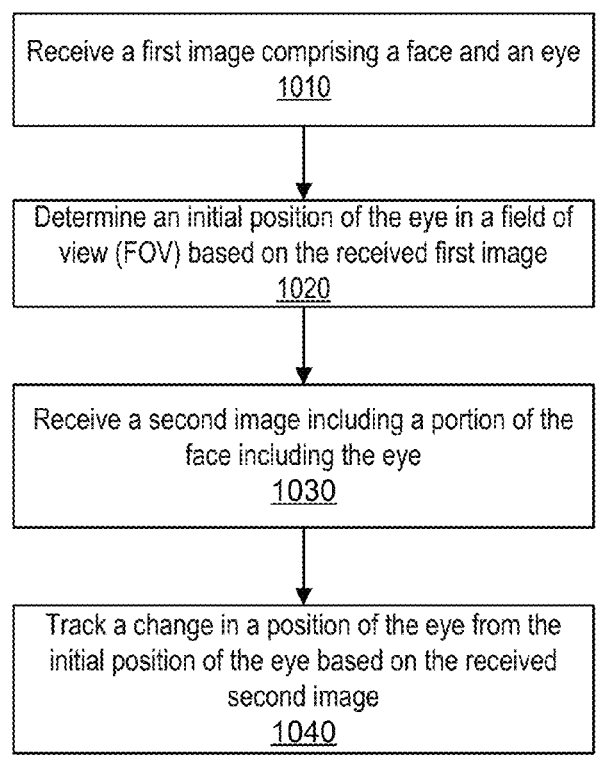
FIG. 10 illustrates a flowchart of an exemplary method for tracking an eye, according to some embodiments.

FIG. 10 illustrates a flowchart of an exemplary method for tracking an eye, according to some embodiments. In block 1010, a first image including a face and an eye is received. For example, in FIG. 1, the camera may capture an image including a face an eye. The eye-tracking module may then receive the captured image for further processing and/or to provide access to the image to the various sub-tracker modules.

In block 1020, an initial position of the eye in a field of view (FOV) is determined based on the received first image. For example, in FIG. 1, the CS sub-tracker module may determine an initial position of the eye in the FOV. Additionally, the DF sub-tracker module may determine features associated with the eye in the FOV. In some embodiments, a plurality of positive image samples are generated by the CS sub-tracker module, each representing a high-confidence detection of the eye. In some embodiments, a plurality of negative image samples are generated by the CS sub-tracker module, each representing a high-confidence detection of a portion of the first image other than the eye. In some embodiments, the DF sub-tracker module may generate an intersection bounding box comprising the eye and a subset of the portion of the face.

In block 1030, a second image including a portion of the face including the eye is received. For example, in FIG. 1, the camera may capture a second image including a portion of the face including the eye. The eye-tracking module may then receive the captured image for further processing and/or to provide access to the image to the various sub-tracker modules.

In block 1040, a change in a position of the eye from the initial position of the eye based on the received second image is tracked. For example, in FIG. 1, the combination of the CS sub-tracker module, DF sub-tracker module, and OF sub-tracker module may be combined to successfully track the eye and generate a solution that is robust enough to resolve the aforementioned problems of conventional eye trackers. Of note, unlike conventional eye-tracking methods, none of the sub-trackers described require the recognition of the entire face, and thus only a portion of the face (including the eyes) need be available in the FOV in order for the methods of the present disclosures to succeed. Furthermore, the sub-trackers may not need to restart the process of detecting the eye prior to tracking if a face (or portion of the face) leaves the FOV and reenters the FOV at a later time. The combination of the three sub-trackers provides these advantages and further advantages such as lower power use and faster processing as compared to current techniques because the entire face need not be tracked all the time. In some embodiments, tracking step is performed in real-time.

In some embodiments, tracking a change in the position of the eye is based further on the plurality of positive image samples and the plurality of negative image samples. In some embodiments, tracking a change in the position of the eye is based further on the intersection bounding box.

In some embodiments, the OF sub-tracker module detects motion of the eye between the first image and the second image. In some embodiments, tracking a change in the position of the eye is based further on the detected motion of the eye.

Exemplary Computing System

Figure 11:
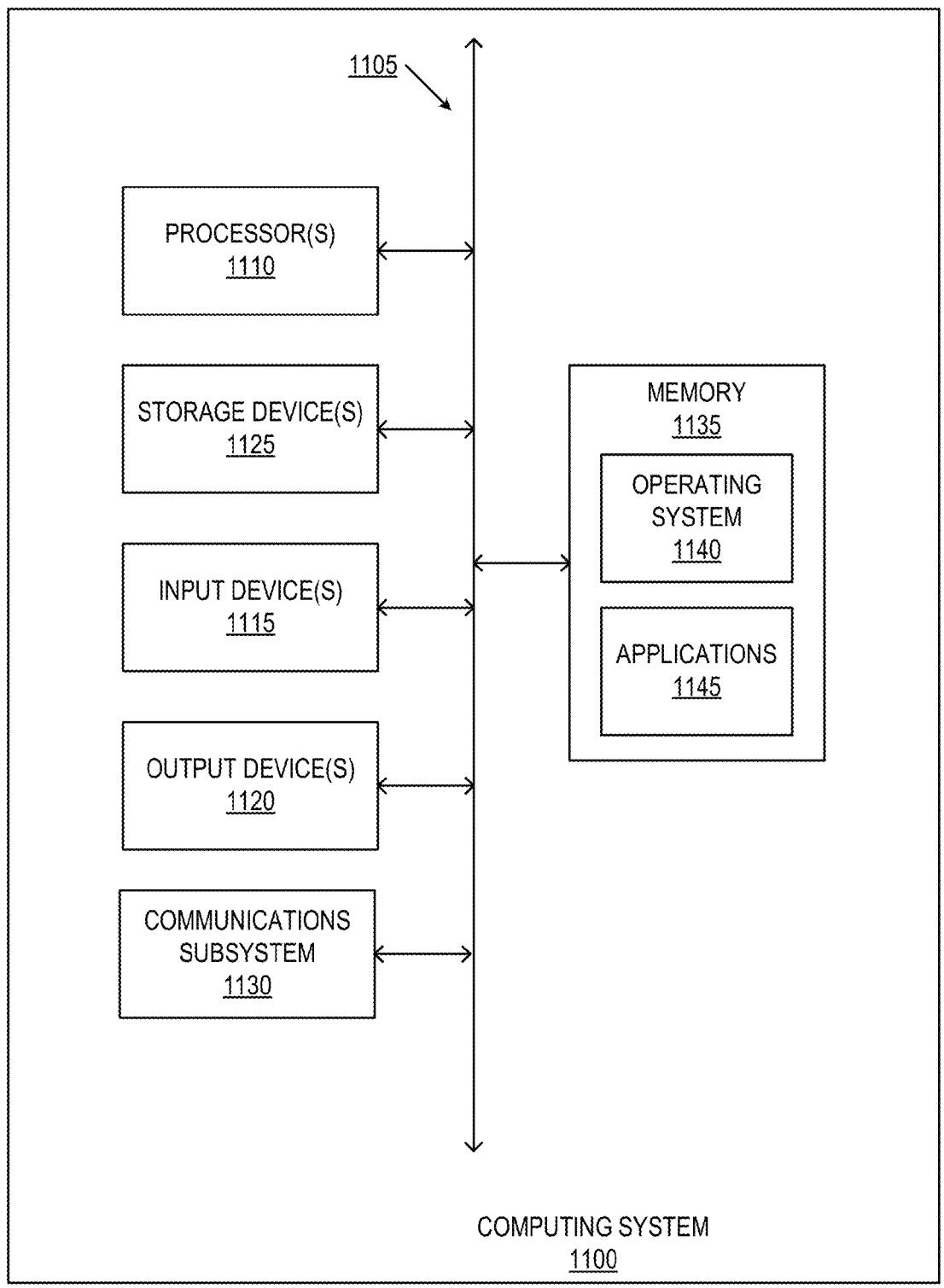
FIG. 11 illustrates an example of a computing system in which one or more embodiments may be implemented.

FIG. 11 illustrates an example of a computing system in which one or more embodiments may be implemented. A computer system as illustrated in FIG. 11 may be incorporated as part of the above described eye-tracking system. For example, computer system 1100 can represent some of the components of a television, a computing device, a server, a desktop, a workstation, a control or interaction system in an automobile, a tablet, a netbook or any other suitable computing system. A computing device may be any computing device with an image capture device or input sensory unit and a user output device. An image capture device or input sensory unit may be a camera device. A user output device may be a display unit. Examples of a computing device include but are not limited to video game consoles, tablets, smart phones and any other hand-held devices. FIG. 11 provides a schematic illustration of one embodiment of a computer system 1100 that can perform the methods provided by various other embodiments, as described herein, and/or can function as the host computer system, a remote kiosk/terminal, a point-of-sale device, a telephonic or navigation or multimedia interface in an automobile, a computing device, a set-top box, a table computer and/or a computer system. FIG. 11 is meant only to provide a generalized illustration of various components, any or all of which may be utilized as appropriate. FIG. 11, therefore, broadly illustrates how individual system elements may be implemented in a relatively separated or relatively more integrated manner. In some embodiments, computer system 1100 may be used to implement functionality of the system described in FIG. 1.

The computer system 1100 is shown comprising hardware elements that can be electrically coupled via a bus 1105 (or may otherwise be in communication, as appropriate). The hardware elements may include one or more processors 1110, including without limitation one or more general-purpose processors and/or one or more special-purpose processors (such as digital signal processing chips, graphics acceleration processors, and/or the like); one or more input devices 1115, which can include without limitation one or more cameras, sensors, a mouse, a keyboard, a microphone configured to detect ultrasound or other sounds, and/or the like; and one or more output devices 1120, which can include without limitation a display unit such as the device used in embodiments of the invention, a printer and/or the like.

In some implementations of the embodiments of the invention, various input devices 1115 and output devices 1120 may be embedded into interfaces such as display devices, tables, floors, walls, and window screens. Furthermore, input devices 1115 and output devices 1120 coupled to the processors may form multi-dimensional tracking systems.

The computer system 1100 may further include (and/or be in communication with) one or more non-transitory storage devices 1125, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 1100 might also include a communications subsystem 1130, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1130 may permit data to be exchanged with a network, other computer systems, and/or any other devices described herein. In many embodiments, the computer system 1100 will further comprise a non-transitory working memory 1135, which can include a RAM or ROM device, as described above.

The computer system 1100 also can comprise software elements, shown as being currently located within the working memory 1135, including an operating system 1140, device drivers, executable libraries, and/or other code, such as one or more application programs 1145, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1125 described above. In some cases, the storage medium might be incorporated within a computer system, such as computer system 1100. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1100 and/or might take the form of source and/or installable code, which, upon compilation and/or installation on the computer system 1100 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed. In some embodiments, one or more elements of the computer system 1100 may be omitted or may be implemented separate from the illustrated system. For example, the processor 1110 and/or other elements may be implemented separate from the input device 1115. In one embodiment, the processor is configured to receive images from one or more cameras that are separately implemented. In some embodiments, elements in addition to those illustrated in FIG. 11 may be included in the computer system 1100.

Some embodiments may employ a computer system (such as the computer system 1100) to perform methods in accordance with the disclosure. For example, some or all of the procedures of the described methods may be performed by the computer system 1100 in response to processor 1110 executing one or more sequences of one or more instructions (which might be incorporated into the operating system 1140 and/or other code, such as an application program 1145) contained in the working memory 1135. Such instructions may be read into the working memory 1135 from another computer-readable medium, such as one or more of the storage device(s) 1125. Merely by way of example, execution of the sequences of instructions contained in the working memory 1135 might cause the processor(s) 1110 to perform one or more procedures of the methods described herein.

The terms "machine-readable medium" and "computer-readable medium," as used herein, refer to any medium that participates in providing data that causes a machine to operate in a specific fashion. In some embodiments implemented using the computer system 1100, various computer-readable media might be involved in providing instructions/code to processor(s) 1110 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1125. Volatile media include, without limitation, dynamic memory, such as the working memory 1135. Transmission media include, without limitation, coaxial cables, copper wire and fiber optics, including the wires that comprise the bus 1105, as well as the various components of the communications subsystem 1130 (and/or the media by which the communications subsystem 1130 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1100. These signals, which might be in the form of electromagnetic signals, acoustic signals, optical signals and/or the like, are all examples of carrier waves on which instructions can be encoded, in accordance with various embodiments of the invention.

The communications subsystem 1130 (and/or components thereof) generally will receive the signals, and the bus 1105 then might carry the signals (and/or the data, instructions, etc. carried by the signals) to the working memory 1135, from which the processor(s) 1110 retrieves and executes the instructions. The instructions received by the working memory 1135 may optionally be stored on a non-transitory storage device 1125 either before or after execution by the processor(s) 1110.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments are described as processes depicted as flow diagrams or block diagrams. Although each may describe the operations as a sequential process, many of the operations can be performed in parallel or concurrently. In addition, the order of the operations may be rearranged. A process may have additional steps not included in the figures. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks. Thus, in the description above, functions or methods that are described as being performed by the computer system may be performed by a processor—for example, the processor 1110—configured to perform the functions or methods. Further, such functions or methods may be performed by a processor executing instructions stored on one or more computer readable media.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

Various examples have been described. These and other examples are within the scope of the following claims.

What is claimed is:

1. A method for tracking an eye, the method comprising:
   receiving a first image comprising a face and the eye;
   determining an initial position of the eye in a field of view (FOV) based on the received first image;
   receiving a second image comprising a portion of the face including the eye; and
   tracking a change in a position of the eye from the initial position of the eye based on the received second image, wherein tracking the change is based at least on a convergence of results outputted by a plurality of tracking modules, the plurality of tracking modules including (1) a first tracking module configured to track an iris portion of the eye, (2) a second tracking module configured to generate a portion of the face that includes the eye and a surrounding region having features other than the eye, and (3) a third tracking module configured to compare differences between the first received image and the second received image;
   wherein the convergence of results is based on at least one high confidence position of the eye generated by each one of the plurality of tracking modules.

2. The method of claim 1, further comprising generating a plurality of positive image samples, each representing a high-confidence detection of the eye.

3. The method of claim 2, further comprising generating a plurality of negative image samples, each representing a high-confidence detection of a portion of the first image other than the eye.

4. The method of claim 3, wherein tracking a change in the position of the eye is based further on the plurality of positive image samples and the plurality of negative image samples.

5. The method of claim 1, further comprising generating an intersection bounding box comprising the eye and a subset of the portion of the face, and wherein tracking a change in the position of the eye is based further on the intersection bounding box.

6. The method of claim 1, further comprising detecting motion of the eye between the first image and the second image.

7. The method of claim 6, wherein tracking a change in the position of the eye is based further on the detected motion of the eye.

8. The method of claim 1, wherein the tracking step is performed in real-time.

9. An apparatus for tracking an eye, the apparatus comprising:
a camera configured to capture one or more images;
a memory comprising a plurality of tracking modules; and
a processor coupled to the camera and the memory, the processor operable, when the one or more tracking modules are executed, to:
receive, via the camera, a first image comprising a face and the eye;
determine an initial position of the eye in a field of view (FOV) based on the received first image;
receive, via the camera, a second image comprising a portion of the face including the eye; and
track a change in a position of the eye from the initial position of the eye based on the received second image, wherein tracking the change is based at least on a convergence of results outputted by the plurality of tracking modules, the plurality of tracking modules including (1) a first tracking module configured to track an iris portion of the eye, (2) a second tracking module surrounding region having features other than the eye, and (3) a third tracking module configured to compare differences between the first received image and the second received image;
wherein the convergence of results is based on at least one high confidence position of the eye generated by each one of the plurality of tracking modules.

10. The apparatus of claim 9, wherein the processor is further operable, when the one or more tracking modules are executed, to generate a plurality of positive image samples, each representing a high-confidence detection of the eye.

11. The apparatus of claim 10, wherein the processor is further operable, when the one or more tracking modules are executed, to generate a plurality of negative image samples, each representing a high-confidence detection of a portion of the first image other than the eye.

12. The apparatus of claim 11, wherein tracking a change in the position of the eye is based further on the plurality of positive image samples and the plurality of negative image samples.

13. The apparatus of claim 9, wherein the processor is further operable, when the one or more tracking modules are executed, to generate an intersection bounding box comprising the eye and a subset of the portion of the face, and wherein tracking a change in the position of the eye is based further on the intersection bounding box.

14. The apparatus of claim 9, wherein the processor is further operable, when the one or more tracking modules are executed, to detection motion of the eye between the first image and the second image.

15. The apparatus of claim 14, wherein tracking a change in the position of the eye is based further on the detected motion of the eye.

16. The apparatus of claim 9, wherein the tracking is performed in real-time.

17. An apparatus for tracking an eye, the apparatus comprising:
means for receiving a first image comprising a face and the eye;
means for determining an initial position of the eye in a field of view (FOV) based on the received first image;
means for receiving a second image comprising a portion of the face including the eye; and
means for tracking a change in a position of the eye from the initial position of the eye based on the received second image, wherein tracking the change is based at least on a means for converging results outputted by a plurality of tracking modules, the plurality of tracking modules including (1) a first tracking module configured to track an iris portion of the eye, (2) a second tracking module configured to generate a portion of the face that includes the eye and a surrounding region having features other than the the eye, and (3) a third tracking module configured to compare differences between the first received image and the second received image;
wherein the means for converging results is based on at least one high confidence position of the eye generated by each one of the plurality of tracking modules.

18. The apparatus of claim 17, further comprising means for generating a plurality of positive image samples, each representing a high-confidence detection of the eye.

19. The apparatus of claim 18, further comprising means for generating a plurality of negative image samples, each representing a high-confidence detection of a portion of the first image other than the eye.

20. The apparatus of claim 19, wherein tracking a change in the position of the eye is based further on the plurality of positive image samples and the plurality of negative image samples.

21. The apparatus of claim 17, further comprising means for generating an intersection bounding box comprising the eye and a subset of the portion of the face, and wherein tracking a change in the position of the eye is based further on the intersection bounding box.

22. The apparatus of claim 17, further comprising means for detecting motion of the eye between the first image and the second image.

23. The apparatus of claim 22, wherein tracking a change in the position of the eye is based further on the detected motion of the eye.

24. A processor-readable non-transitory computer-readable medium comprising processor readable instructions configured to cause a processor to:
receive a first image comprising a face and an eye;
determine an initial position of the eye in a field of view (FOV) based on the received first image;
receive a second image comprising a portion of the face including the eye; and
track a change in a position of the eye from the initial position of the eye based on the received second image, wherein tracking the change is based at least on a convergence of results outputted by a plurality of tracking modules, the plurality of tracking modules including (1) a first tracking module configured to track an iris portion of the eye, (2) a second tracking module configured to generate a portion of the face (3) a third tracking module configured to compare differences between the first received image and the second received image;

wherein the convergence of results is based on at least one high confidence position of the eye generated by each one of the plurality of tracking modules.

25. The non-transitory computer-readable medium of claim 24, wherein the processor readable instructions are further configured to cause the processor to generate a plurality of positive image samples, each representing a high-confidence detection of the eye.

26. The non-transitory computer-readable medium of claim 25, wherein the processor readable instructions are further configured to cause the processor to generate a plurality of negative image samples, each representing a high-confidence detection of a portion of the first image other than the eye.

27. The non-transitory computer-readable medium of claim 26, wherein tracking a change in the position of the eye is based further on the plurality of positive image samples and the plurality of negative image samples.

28. The non-transitory computer-readable medium of claim 24, wherein the processor readable instructions are further configured to cause the processor to generate an intersection bounding box comprising the eye and a subset of the portion of the face, and wherein tracking a change in the position of the eye is based further on the intersection bounding box.

29. The non-transitory computer-readable medium of claim 24, wherein the processor readable instructions are further configured to cause the processor to detect motion of the eye between the first image and the second image.

30. The non-transitory computer-readable medium of claim 29, wherein tracking a change in the position of the eye is based further on the detected motion of the eye.

* * * * *